United States Patent [19]

Loomer

[11] 3,973,685
[45] Aug. 10, 1976

[54] PHOTOELECTRIC SENSING APPARATUS FOR PALLET STORAGE SYSTEMS
[75] Inventor: Weston R. Loomer, Walton, Ky.
[73] Assignee: Litton Systems, Inc., Beverly Hills, Calif.
[22] Filed: June 23, 1975
[21] Appl. No.: 589,141

Related U.S. Application Data
[63] Continuation-in-part of Ser. No. 425,495, Dec. 17, 1973, abandoned.

[52] U.S. Cl............................ 214/16 B; 214/16.4 B; 250/223 R; 214/16.4 A
[51] Int. Cl.² ........................................... B65E 1/06
[58] Field of Search ...................... 250/223 R, 224; 214/16 B, 16.4 R, 16.4 A, 16.4 B; 105/238 R

[56] References Cited
UNITED STATES PATENTS

| | | | |
|---|---|---|---|
| 3,272,347 | 9/1966 | Lemelson...................... | 214/16.4 A |
| 3,417,879 | 12/1968 | Gough............................ | 214/16 B |
| 3,450,887 | 6/1969 | Nirenberg ...................... | 250/223 R |
| 3,557,973 | 1/1971 | Louviers.......................... | 214/16 B |
| 3,695,463 | 10/1972 | Weisker et al. ................ | 214/16.4 A |
| 3,749,923 | 7/1973 | Husome .......................... | 250/223 R |
| 3,800,963 | 4/1974 | Holland ......................... | 214/16.4 A |
| 3,848,755 | 11/1974 | Bussienne et al. ............. | 214/16.4 A |

Primary Examiner—Robert J. Spar
Assistant Examiner—R. B. Johnson
Attorney, Agent, or Firm—Robert M. Vargo; Walter R. Thiel

[57] ABSTRACT

A photoelectric sensing apparatus for a pallet carrying robot vehicle is disclosed. The sensing apparatus includes a plurality of photoelectric sensors mounted on the robot vehicle for sensing the location of stored pallets mounted on storage rails in order to signal the control logic to stop the robot vehicle at a desired position. If the robot vehicle is unloaded, one sensor functions to sense the location of a stored pallet after the robot vehicle has moved directly under the stored pallet. If the robot vehicle is loaded, another sensor functions to sense the location of a stored pallet immediately before the robot vehicle reaches the same. Each sensor comprises a light transmitter for projecting a light beam along a first axis, and a receiver sensitive along a second axis to receive a reflected light signal and generate an electrical signal in response thereto. The transmitter and receiver are angularly oriented with respect to each other to enable the first and second axes to intersect at a junction located at a predetermined height above the robot vehicle. This height is at the same plane as the stored pallets in order for the sensor to be responsive only to the pallet and not to any extraneous objects located in any other plane.

5 Claims, 5 Drawing Figures

PHOTOELECTRIC SENSING APPARATUS FOR PALLET STORAGE SYSTEMS

RELATED APPLICATION

The present application is a continuation-in-part of U.S. pat. application Ser. No. 425,495, filed Dec. 17, 1973 now abandoned.

FIELD OF THE INVENTION

The present invention relates generally to automated storage systems utilizing robot vehicles for transporting pallets to and from a storage rack and, more particularly, to photoelectric sensing devices mounted on the robot vehicles for detecting the proximity of pallets located in the storage rack.

SUMMARY OF THE INVENTION

In its broadest aspect, the present invention encompasses a sensing apparatus comprising a photoelectric sensor mounted on a pallet carrying robot vehicle. The robot vehicle is motivated by a drive motor which is controlled by a central control logic system. Each sensor includes a transmitter for projecting a light beam along a first axis and a receiver sensitive along a second axis to receive a reflected light and generate an electrical signal in response thereto. The transmitter and receiver are angularly oriented relative to each other such that the first and second axes intersect at a junction located at a predetermined height above the robot vehicle.

A primary advantage of the present invention is that the height of the axes intersection is at the same plane as the stored pallets or any other preselected reflecting surface in order to enable only the pallets or the preselected reflecting surface to reflect the light from the transmitter to the receiver to create a command signal to the central control logic. According to the present invention, the sensors would be impervious to any structure located above or below the plane of the intersected axes, and, therefore, would not generate a false signal due to detecting structures other than the preselected reflecting surface.

The features of the present invention which are believed to be novel are set forth with particularity in the appended Claims. The present invention, together with the further advantages thereof, may best be understood by reference to the following description taken in connection with the accompanying drawings.

DESCRIPTION OF THE PREFERRED EMBODIMENT

Figure 1:
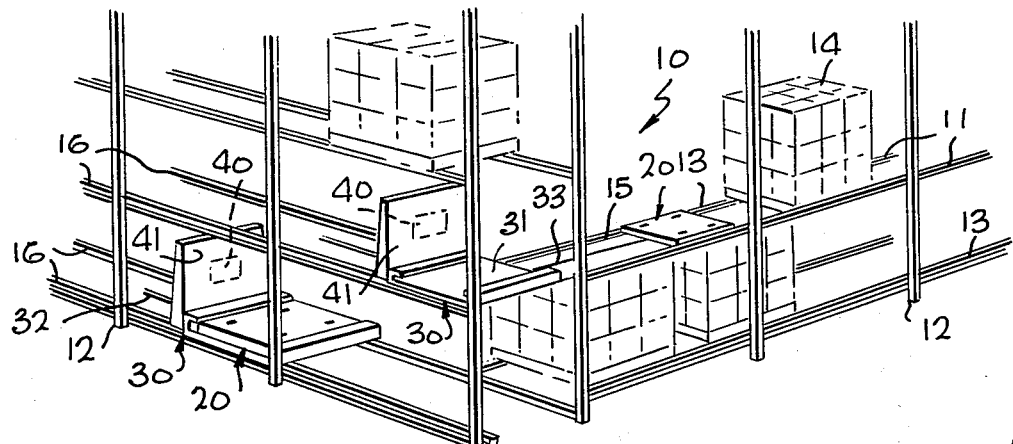
FIG. 1 is a perspective view of a storage system utilizing robot vehicles for transporting pallets along a plurality of track sections.

Referring now to the drawings, FIG. 1 illustrates an automated storage system, generally indicated by arrow 10, comprising a storage rack formed by a plurality of horizontal rails 11 supported by vertical columns 12. Each pair of rails 11 comprise a track forming an open-faced storage compartment. The storage rack can be single or multi-tiered with the storage compartments for each tier being spaced in parallel. For illustrative purposes, only one column of storage compartments is shown, although parallel compartments are formed all along the front face of the rack.

The upper surfaces 13 of the rail 11 forming each track storage compartment are adapted to support loaded pallets 14. The rails 11 also include lower rail surfaces 15 for supporting the wheels 19 of a robot vehicle 20. The robot vehicle 20 is adapted to ride along the rails 11 and, when empty, can move under the pallets 14 stored on the upper rails 13.

The front face of the rack includes transverse tracks 16, also supported by the vertical columns 12, for carrying a plurality of transfer carriages 30. Each transfer carriage 30 is adapted to move along a respective tier to position itself directly in front of the openings of the storage compartments on that tier. Each transfer carriage 30 includes an upper bay area 31 for receiving and transporting one of the robot vehicles 20.

Electrical power is supplied to the transfer carriage 30 by a cable 32 which is connected to a power source (not shown). In a similar manner, electrical power is provided to the robot vehicle 20 from the transfer carriage 30 via a cable 33. The cable 33 is wound about a rotatable drum (not shown) under the robot vehicle 20 to enable the cable 33 to be paid out as the robot vehicle 20 moves away from the transfer carriage 30 and into the storage compartment.

The movement and operation of the transfer carriage 30 and the robot vehicle 20 is controlled and governed by a central control logic 40 located in a cabinet 41 mounted on the transfer carriage 30. The central control logic 40 is equipped and programmed to sequentially start and stop various motors (described hereinafter), located on the transfer carriage 30 and the robot vehicle 20, to perform various operations.

Figure 2:
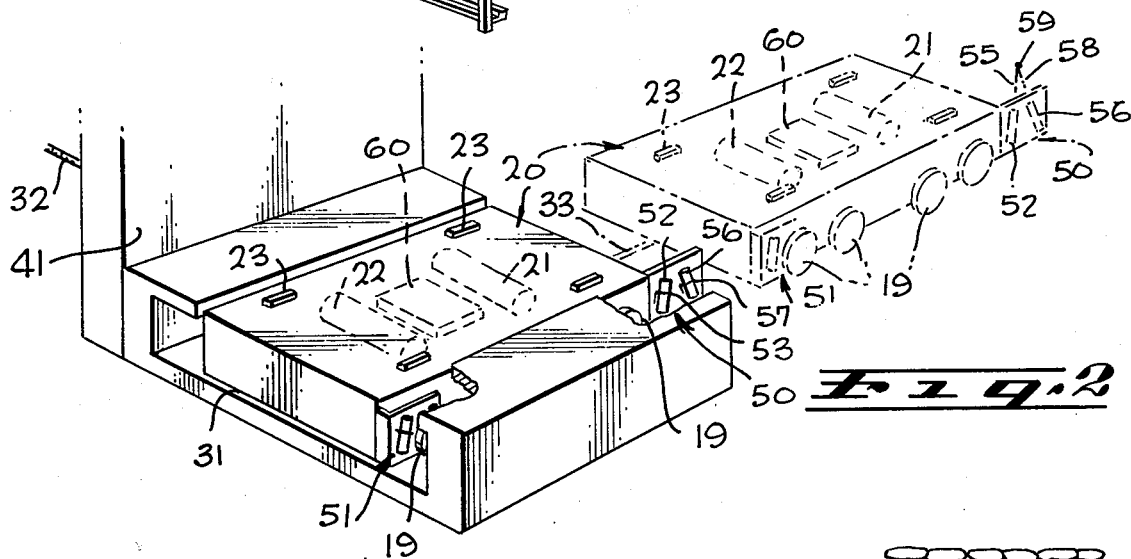
FIG. 2 is a perspective view of a transfer and robot vehicle assembly with the robot vehicle having a sensing apparatus, in accordance with the present invention, located thereon.

As shown in FIG. 2, each robot vehicle 20 includes a drive motor 21 mounted thereunder for driving the wheels 19. The coupling between the wheels 19 and the drive motor 21 is through conventional pulley and belt means (not shown).

A second drive motor 22 is also mounted beneath each robot vehicle 20 and is drivingly connected to a plurality of lift mechanisms 23 which function to raise and lower the loaded pallets 14 onto the storage tracks 11.

Each robot further includes a pair of photoelectric sensors 50 and 51 mounted thereon to function as the "eyes" for the robot vehicle 20 in order to sense the proximity of the loaded pallets 14. The sensor 50 is utilized to sense the proximity of a stored pallet 14 when the robot vehicle 20 is loaded to enable the robot vehicle 20 to stop just prior to the stored pallet 14 in order to deposit the transported pallet 14. The sensor 51 is utilized to sense the proximity of a stored pallet 14 when the robot vehicle 20 is empty, to enable the robot vehicle 20 to stop after it has gone under the stored pallet 14 in order to retrieve the same.

Each of the sensors 50 and 51 function to generate an electrical signal upon actuation to be sent, via a signal encoding logic 60 located on the robot vehicle 20, to the central control logic 40, in a manner well known in the art.

Each sensing apparatus 50 or 51 comprises a transmitter 52 mounted on the robot vehicle 20 by means of a flange 53 integrally connected to a mounting plate 54 which in turn is connected to one side of the robot vehicle 20. The sensor 50 is mounted to extend approximately 10 inches in front of the robot vehicle 20 while the sensor 51 is mounted approximately 4 inches from the back of the robot vehicle 20. The transmitter 52 is adapted to project a light beam along a first axis 55, which is approximately 75° with respect to the horizontal plane.

A receiver 56 is also mounted on the mounting plate 54 by means of a flange 57. The receiver 56 is sensitive along a second axis 58 to sense any light energy emanating along the second axis 58. The receiver 56 is mounted to enable the second axis 58 to also be positioned approximately 75° with respect to the horizontal plane. The transmitter 41 and the receiver 51 are angularly oriented relative to each other to enable the first and second axes 55 and 58 intersect at a junction 59.

In operation the transmitter 52 projects a light beam along the first axis 55. This light beam continues outwardly until it contacts a body to be reflected thereby. The angle of reflection, of course, is equal to the angle of incidence that the light beam has with respect to the body. If the body is located on the horizontal plane at junction 59, the projected beam from the transmitter 52 will reflect off the body along the second axis 58. This reflected light beam is then received by the receiver 56 to then generate an appropriate electrical signal. It should be noted that if a body is located above or below the horizontal plane at the junction 59, the light beam would not be reflected back to the receiver 51.

Figure 5:
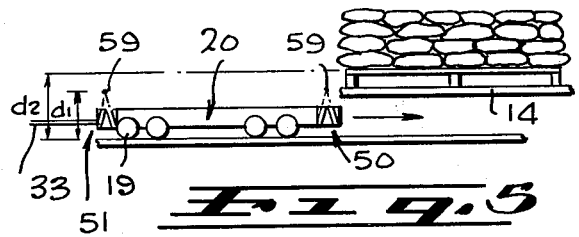
FIG. 5 is an elevational view of the robot vehicle approaching a pallet having a load extending over the outer sides thereof.
Figure 3:
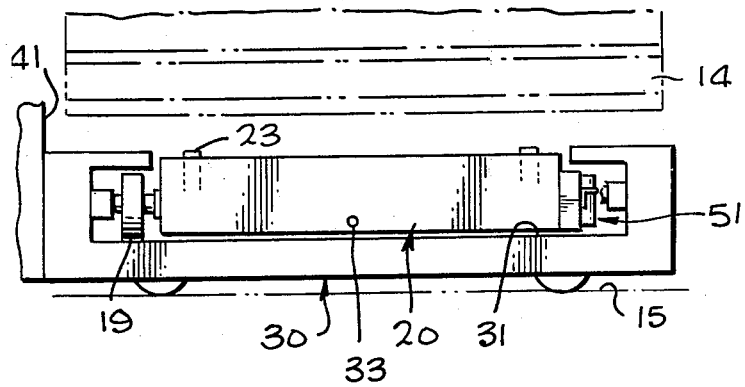
FIG. 3 is an elevational view of the transfer and robot vehicle assembly located beneath a pallet.
Figure 4:
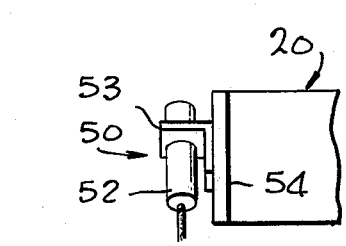
FIG. 4 is a fragmentary view of the photoelectric sensing apparatus of the present invention.

In the preferred embodiment, the transmitter 52 and receiver 56 are angularly oriented in such a manner that the junction 59 would occur at the height that a stored pallet 14 would be located (shown by $d_1$ in FIG. 5). In this manner, light signals from hitting the pallet 14 would only be received by the receiver 56 when the projected beams contact the pallet 14. The loads carried on the pallet would, of course, be located above the horizontal plane (shown by $d_2$ in FIG. 5) and would not be picked up by the sensing apparatus 56. As a result, the sensing apparatus is incapable of receiving false information to command the vehicle 20 to stop at undesired locations. The advantage of the present invention is that in many storage systems, the loads on the pallets 14 extend beyond the sides of the pallets 14. In this case, if the photoelectric sensor could sense any object located above it (which would occur if the transmitter and receiver were parallel), the sensor would see the overhanging load before it sees the pallet 14. If this would occur, the unloaded robot vehicle 20 would be commanded to stop before it reaches a position directly under the pallet 14. The present embodiment would not see the overhanging load because it would be located above the predetermined junction 59.

It should be noted that various modifications can be made to the assembly while still remaining within the purview of the following claims. For example, it would be obvious to mount the transmitter 52 and receiver 56 in various angular positions to vary the junction 59. As a result, any desired height $d_1$ can be sensed exclusively by the sensing apparatus 50 or 51.

What is claimed is:

1. In an automated storage system having a storage rack for receiving a quantity of loaded pallets with a reflecting surface thereon and a robot vehicle movable into and out of said storage rack for respectively retrieving and depositing loaded pallets from and onto said storage rack, said storage system comprising:

means on said robot vehicle for lifting a loaded pallet and propelling said robot vehicle;

logic means for controlling the operation of said propelling means;

first and second photoelectric means mounted on said robot vehicle, said first means operative in response to a loaded condition of the vehicle for sensing the proximity of a loaded pallet on the storage rack ahead of said vehicle, and said second photoelectric means operative in response to an unloaded condition of said vehicle for sensing when said vehicle has been positioned underneath a stored pallet on the rack, said sensing means including a transmitter for projecting a light beam along a first axis, and a receiver for receiving a reflected light beam along a second axis, said transmitter and receiver being angularly oriented relative to each other to enable the first and second axis to intersect at a junction located in the same horizontal plate as a preselected reflecting surface of said pallet, said photoelectric sensing means having means for generating an electrical signal when the moving robot vehicle causes the sensing means to pass under said preselected reflecting surface thereby enabling the preselected surface to reflect the projected light beam from the transmitter to the receiver, and means for feeding said signal to said logic means.

2. The storage system of claim 1 wherein said photoelectric sensing means are mounted slightly ahead of the forward end of the robot vehicle with respect to its direction of travel.

3. The storage system of claim 1 wherein said photoelectric sensing means are mounted slightly ahead of the rearward end of the robot vehicle with respect to its direction of travel.

4. The storage system of claim 1 wherein said propelling means comprises an electric drive motor.

5. The storage system of claim 1 wherein said vehicle includes a support plate with a pair of flanges attached thereto, said transmitter and receiver each being mounted on a different one of said flanges.

* * * * *